UNITED STATES PATENT OFFICE.

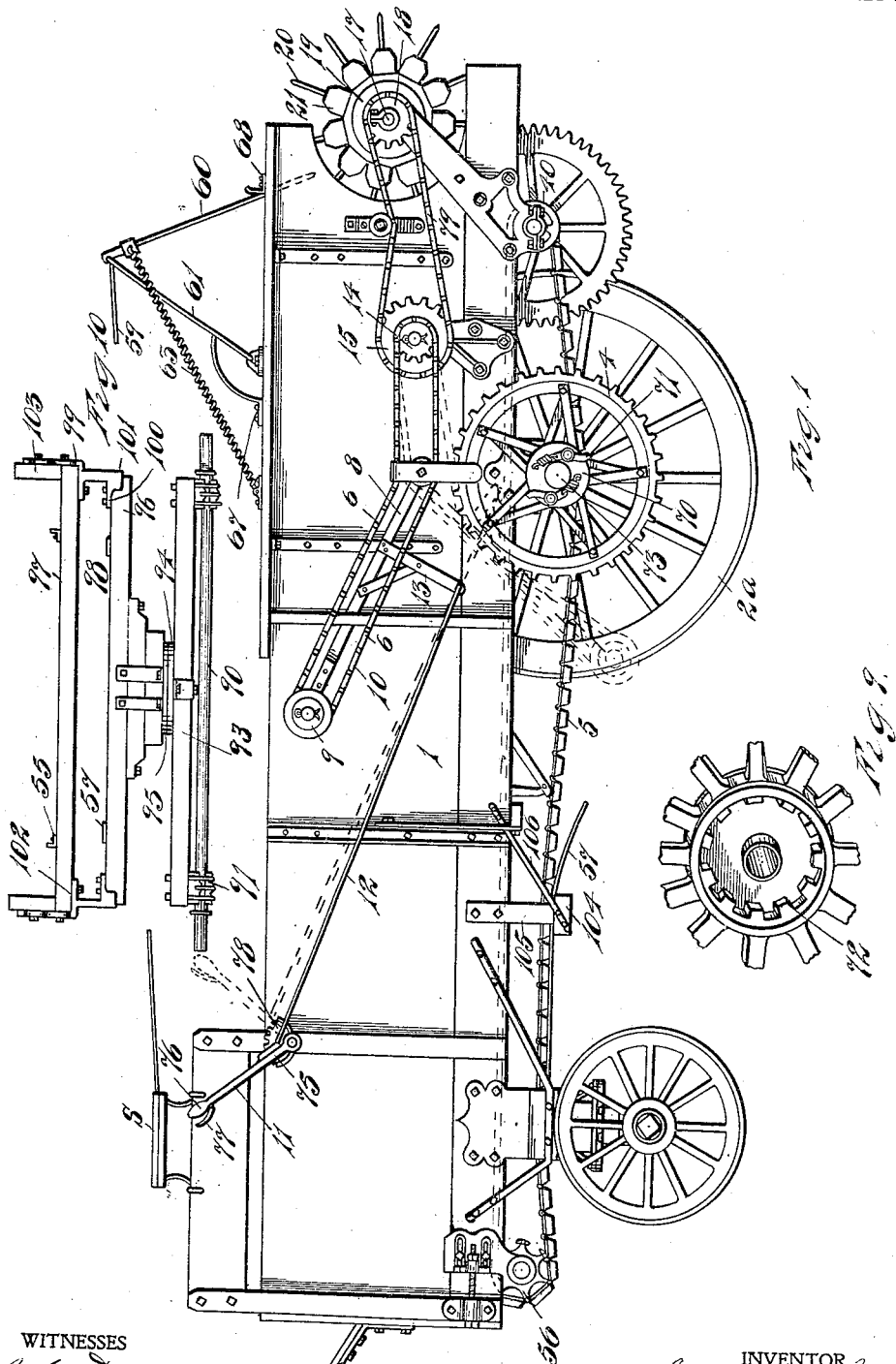

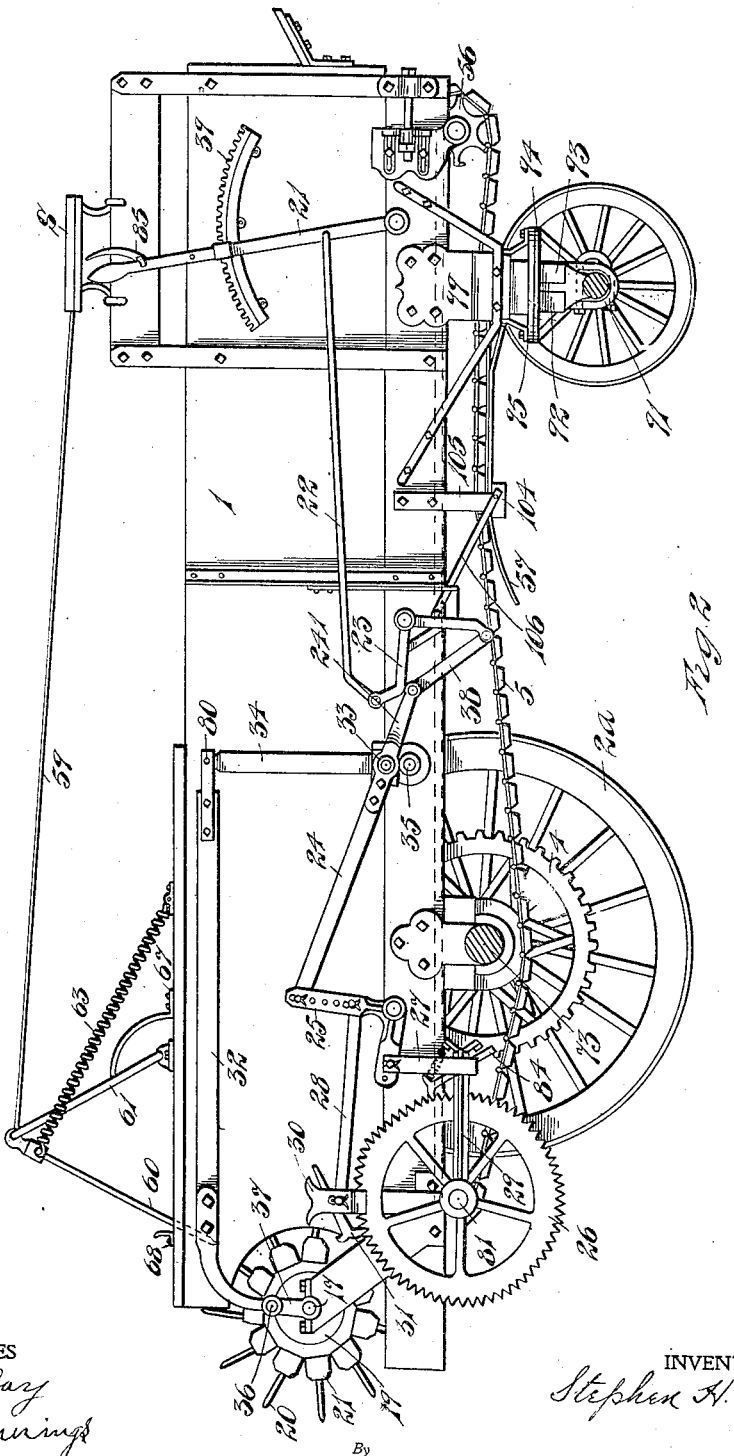

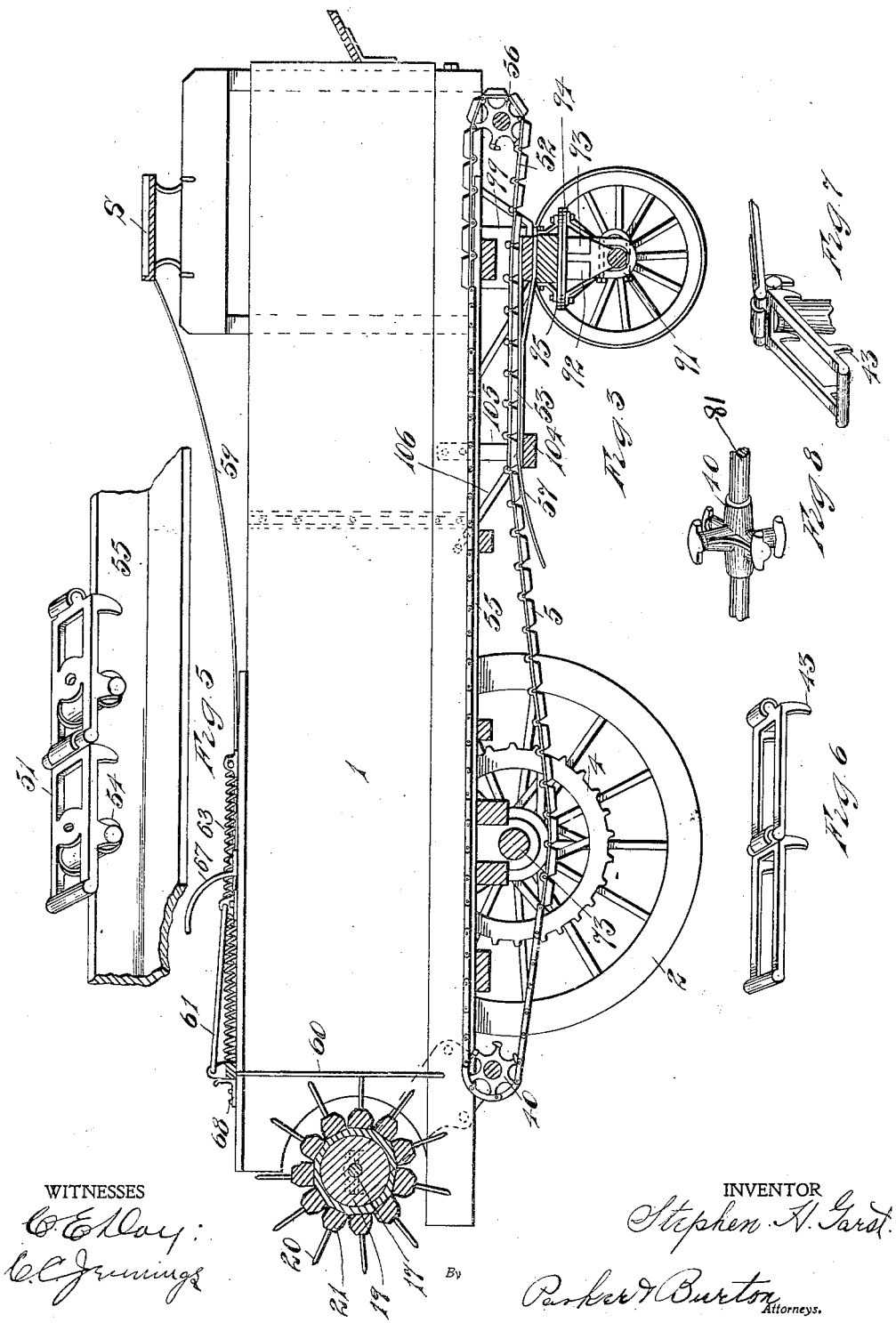

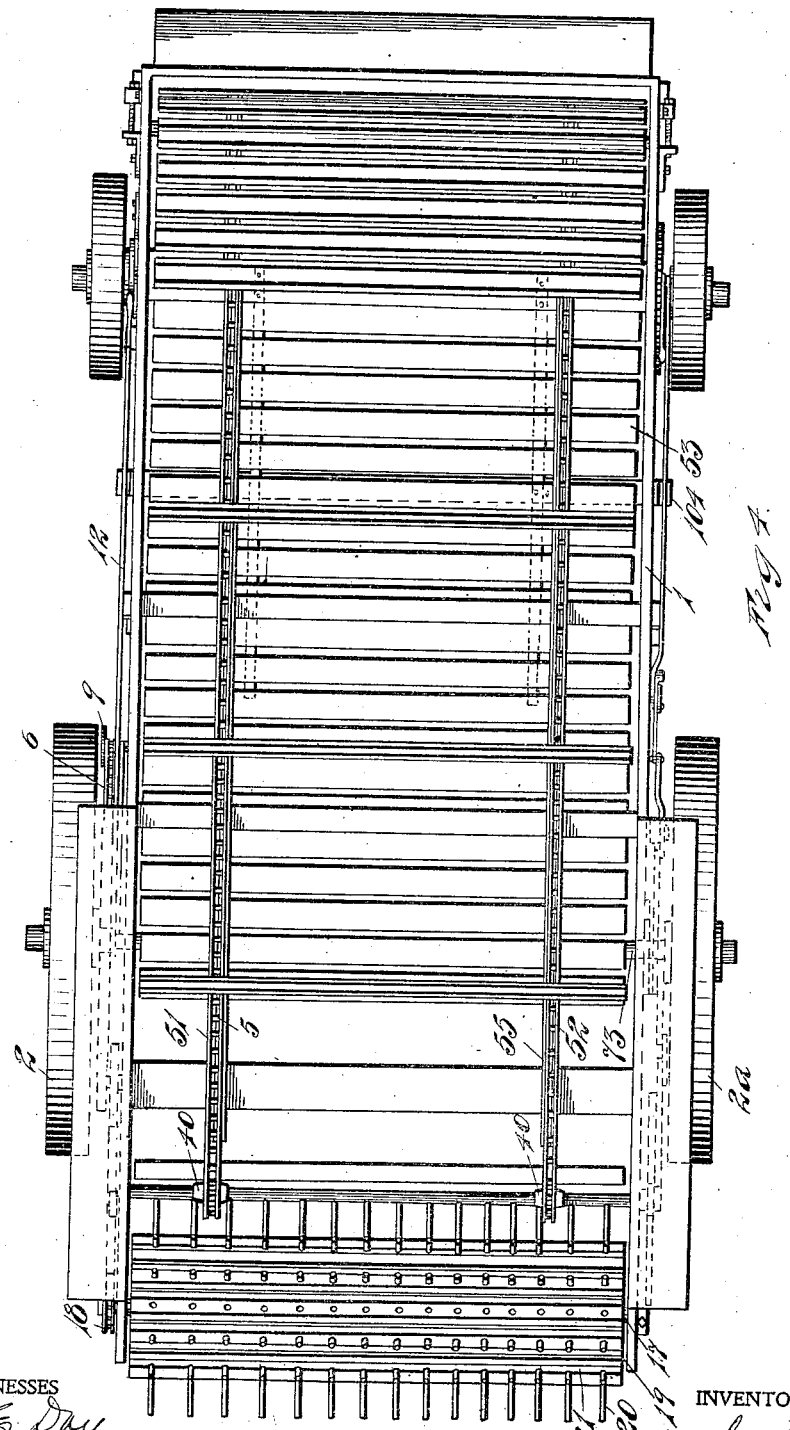

STEPHEN H. GARST, OF DETROIT, MICHIGAN.

MANURE-SPREADER.

No. 903,703.   Specification of Letters Patent.   Patented Nov. 10, 1908.

Application filed November 7, 1906. Serial No. 342,351.

*To all whom it may concern:*

Be it known that I, STEPHEN H. GARST, a citizen of the United States, residing at Detroit, county of Wayne, State of Michigan, have invented a certain new and useful Improvement in Manure-Spreaders, and declare the following to be a full, clear, and exact description of the same, such as will enable others skilled in the art to which it pertains to make and use the same, reference being had to the accompanying drawings, which form a part of this specification.

This invention relates to manure spreaders; it has for its object improvements in that class of machines in which manure is spread automatically from a wagon or cart in which it is transported, and is spread by means of appliances that are actuated by the vehicle wheels acting as traction wheels.

In the drawings:—Figure 1, is an elevation of the left side of the vehicle, the rear drive and supporting wheel being removed. Fig. 2, is an elevation of the right side of the vehicle. Fig. 3, is a longitudinal section. Fig. 4, is a plan view. Fig. 5, is a detail of part of the carrier chain and truck. Fig. 6, is a detail of another part of the carrier chain. Fig. 7, shows a modified form of link. Fig. 8, is a detail of the sprocket wheel which drives the carrier chain. Fig. 9, is a perspective of the inner end of the hub of the rear vehicle wheel, the one at the left end of the rear axle. Fig. 10, is an elevation of the forward axle and bolster. Figs. 5 and 8 inclusive, are perspectives. In Figs. 2 and 3, the axles are sectioned and the rear wheels on the near side are not shown.

The two rear wheels serve as traction wheels. The two rear wheels of the truck are indicated at 2 and 2ª. The rear axle 73 turns in bearings and constitutes a shaft to which is keyed a master-wheel 4; the master wheel transmits motion to all the distributing parts of the machinery. The distributing part of the machinery consists of a carrier 5, that traverses the bottom of the box 1; the upper run of the carrier 5 moves from front to rear and the under-run moves from the rear to front. The carrier is actuated by mechanism, some part of which is shown in Fig. 1. The master wheel 4 revolves with the axle 73, on which it is mounted, under the actuating influence of the rear truck wheel; each rear wheel has a hub provided with an annular or internally toothed ratchet face 72. The teeth of the ratchet wheel on the hub engage pawls 71, pivotally supported on a disk 70 and drive the master wheel 4 when the truck is drawn forward; should the truck be driven backward the pawls 71 slip over the ratchet teeth without producing a backward motion of the master wheel 4.

The distributing mechanism proper is brought into connection or thrown out of connection with the master wheel by means of a swinging sprocket chain 6 that is stretched between a sprocket wheel 14, and a sprocket wheel 9. The sprocket wheel 14 is on an arbor fixed upon the body 1 of the vehicle. The sprocket wheel 9 is on an arbor carried at the end of a swinging arm 8; the arm 8 is pivoted within a guide that is fixed to the body of the vehicle and curves outward from the body of the vehicle and downward with a hanging end which depends below and in close proximity to the upper run of the rim of the master wheel 4. The upper run of the sprocket chain 6 passes through the loop of this guide above the pivot upon which the arm 8 swings. The lower run 10 of the chain 6 passes through the guide below the pivot upon which the arm 8 swings. The arm 8 swings in the plane of the master wheel 4 and the lower run 10 of the chain 6 may be brought into engagement with the master wheel 4, by swinging the arm 8 until it assumes the position shown in dotted lines in Fig. 1. This movement of the swinging arm 8 may be produced from the driver's seat by means of lever and links adapted to that purpose, and which consists of an arm 13, rigidly secured to the arm 8 intermediate its swinging end and its pivoted end, a link 12, pivotally connected to the arm 13, and pivotally connected to a rock-arm 75, which is journaled on a stud that projects from the side of the vehicle box 1, just at the rear of and slightly below the driver's seat S. A branch 11 of the rock-arm provided with a hand grip 76 and a spring latch 77 is actuated manually; the ratchet of the latch 77 engages in the teeth of a quadrant 78, which serves to hold the parts in a selected position within the range of movement of the parts.

On the same shaft with the sprocket wheel 14, and secured to the sprocket wheel 14 to rotate with it, is a second sprocket wheel 15 over which runs a sprocket chain 79 which is stretched between the sprocket wheel 15 and the sprocket wheel 18. The sprocket wheel 18 is secured to the shaft 17 of the rotary distributing cylinder carrier on brackets and located at the rear of the vehicle box 1.

The spreader consists of a drum 19 mounted on the shaft 17 and provided with a number of longitudinal ribs 21 in which are inserted teeth 20. The teeth 20 serve as tearing forks to tear apart and to throw backward the manure brought into the path of the rotating forks by the carrier 5.

The carrier 5 is actuated by mechanism which will be best understood by an examination of Fig. 2. Motion is given to the carrier from the shaft 17, of the rotating drum 19 and this motion is controlled from the driver's seat. The carrier is directly actuated by a wheel 26, to which motion is given by ratchet arms and pawls. In following the chain of mechanism, through from the shaft 17 to the wheel 26, there is first mounted upon the shaft 17 a crank 37, which carries a wrist pin 36; to the wrist pin 36 is secured a pitman 32. The pitman extends along the box 1, to near the middle thereof and is pivoted by pivot 80 to the top of a normally vertical rock-arm 34; the rock-arm 34 is journaled on a stud post 35, that extends horizontally from the side of the box 1. On the rock-arm 34 is a sleeve 33 capable of sliding movement along the rock-arm 34; to the sleeve is pivoted a lever 24, the rear end of which is pinned to the end of a bent lever 25. The bent lever 25 is provided with a number of holes, into any one of which the pin connecting the lever 25 and the lever 24 may be inserted. The bent lever 25 has pivotally connected to it two links 27 and 28. The link 28 is pivotally connected to a ratchet lever 30, and the link 27 is pivotally connected to a ratchet lever 29. The ratchet levers 29 and 30 are both journaled on a shaft 81 of the wheel 26, the same shaft which carries the sprocket wheels 40 of the carrier. Each of the ratchet arms carries at its free end a pawl held in spring engagement with the wheel 26 and arranged to impel the wheel 26 with a motion to carry the upper run of the carrier chains to the rear. The end of the ratchet arm is bent or curved to form a housing for the end of the link 28 and for the pawl 31, and the housing extends below the toothed rim of the wheel 26 and engages or may engage against the rim of the wheel at this part, thereby holding the ratchet lever in its proper position to secure the proper engagement at all times of the pawl 31 with the teeth of the wheel 26. The free end of the ratchet lever 29 is similarly constructed to furnish a housing for the pawl 84. The ratchet levers 29 and 30 are arranged on opposite sides of the wheel 26 and are in close engagement against the hub thereof.

The end 241 of the lever 24 is pivotally connected to a link 38 by which the lever is linked to an angle-lever 23; the angle-lever 23 is pivoted to a reach rod 22 that reaches to and is pivoted to a hand lever 21 provided with a latch 85 that engages in a quadrant 39. The operation of the hand lever 21 moves the sleeve 33 along the rock arm 34 and changes the relative position of the fulcrum of the lever 24, and the fulcrum of the lever 34 thus regulating the oscillation of the bent lever 25, and consequently regulating or determining the amount of the movement of the pawls 31 and 84, along the periphery of the wheel 26, and determining the rapidity of the revolution of that wheel under the actuating force of the axle 17.

The carrier is composed of slats 53 secured to sprocket chains 51 and 52; the sprocket chains run on angle-bar tracks 55 secured to the bottom of the box 1, and the links of the chain, or some portion of them are provided with anti-friction rolls 54. The chains run over a sprocket wheel 40 at the rear end of the box, and a sprocket wheel 56 at the front end. Only a portion of the sprocket chains are covered by the slats, leaving a part of the run of the chains open; this prevents the accumulation of any foreign matter between the upper and under run, as all such matter dropping through between the slats of the carrier drops at once to the ground, and is not held in the space between the two runs of the carrier; also at times when the carrying slats are on the under run, the corners and crevices of the vehicle can be swept out and cleaned without difficulty. While under most circumstances that type of chain which is provided with an antifriction roller 54 upon which it may travel along the trackway is preferable because capable of most easy running, the plain types of chain, illustrated in Figs. 6 and 7, provided with similar depending prongs 43, as in the case of the chain provided with the rollers, may be found useful.

The under run of the carrier passes over the forward axle and over a guard 57 which extends to the rear of the forward axle, forming a part of the reach of the vehicle, and holding the under-run of the carrier above the space into which the wheels turn when the vehicle is turned from a direct path in either direction. At the rear end of the box 1, arranged to co-act with the spreading cylinder 19 and the teeth which project from it is a skeleton end gate 60 pivoted to arms 61, that are pivotally secured to the box 1. A spring 63, secured to the box in front of the pivotal connection between the box and the arm 61, engages with the end gate beneath the point of pivotal connection between the gate and the arm. The spring thus secured to the box and the gate serves to hold the gate in an elevated position when the gate is lifted and to hold it in a lowered position when it is lowered beyond the point at which the spring passes its condition of greatest tension. The gate and arm upon which it swings are lifted manually by a cord 59 that reaches forward to the driver's seat; its upward and forward movement is stopped by an adjustable stop 67, and its downward and rearward movement is stopped by a stop 68, which is fashioned as a guide to engage against the upper part of the cross-bar which forms the frame of the skeleton gate, and guides the gate to its proper position with respect to the load underneath it.

The forward truck is of construction especially adapted to permit the passage of the under-run of the carrier 5 through an opening in the bolster, or between the two members which constitute the upper and the lower part of the bolster; the construction is shown in Fig. 10.

Upon the axle 90 rest castings 91 to which are bolted two members 92 and 93 of a double axle cap; upon the cap rests the lower member 94 of the fifth wheel; the upper member 95 of the fifth wheel rests on the lower member and is secured to the lower cross member 96 of a bolster between which lower member 96 and the upper member 97 is a space 98, through which the lower-run of the chain travels. The members 96 and 97 of the bolster are secured together by bracket castings 99 that are provided with suitable flanges 100 and 101, to engage against the end and along the upper face of the lower member, and is also provided with a step bearing 102, on which the upper member 97 of the bolster rests; the bracket itself is bolted to the longitudinal beam or frame-piece 103, which constitutes the lower part of the side of the vehicle box. The track rails 55 are secured to the upper member 97 of the bolster.

The guard 57 is secured to the lower member 96 on the upper side thereof and braced to the lower side and the guard is also fastened to a hanging cross-bar 104 that crosses under the vehicle at the rear of the truck and is supported by hangers 105 and brace 106, thus constituting a compound reach comprising the side members of the wagon box, and the guard 57, and the cross-bar 104 with its hangers.

What I claim is:—

1. In a manure distributer, the combination with a bottomless receptacle, and traction wheels supporting the same, a pair of rotatable sprocket wheels supported in axial alinement at each end of said receptacle, a carrier rotating in one direction only and comprising endless sprocket chains which travel over said sprocket wheels, cross slats connected to said sprocket chains for a portion of their lengths only so as to provide an opening between the chains approximately one-half the lengths of said chains to enable the manure that drops through the slats of the carrier in the upper run, to fall to the ground when the open space in said carrier arrives below the slats in the continuous one-way movement of said carrier, a rotating beater mounted in the rear of said receptacle above the carrier, and a supporting member for the carrier, said supporting member being adapted to serve as a brace for the frame of the receptacle, and being extended from the front bolster to a fixed projection of the receptacle.

2. An end gate, a pivoted lifting arm therefor, a spring connected to the gate between its pivotal connection with the lifting arm and the lower edge of said gate, whereby said spring serves to hold the gate in both its lifted position and in its lowered position, substantially as described.

3. In a manure distributer, in combination with an end gate, an arm swinging said end gate, a stop adapted to engage against the rear face of said end gate at its lowermost point of travel and hold the same in fixed vertical position and a spring adapted to be strained to its greatest degree at a point intermediate the extreme limits of travel of the gate, and thereby to yieldingly hold the same in either of said positions described, substantially as described.

4. In a manure distributor, the combination with a bottomless manure receptacle, and traction wheels supporting the same, of a rotating beater mounted at the rear of said receptacle, a carrier rotating in one direction only and passing below said beater, said carrier comprising endless chains connected by cross slats for a portion of their lengths only, so as to provide an opening between the chains of the carrier approximately one-half the lengths of said chains to enable the manure that drops through the slats of the carrier in the upper run, to fall to the ground, when the open space of said carrier arrives below the slats in the continuous one-way movement of said carrier, and means for rotating the beater and the carrier from the traction wheels.

5. In a manure spreader, the combination with a manure receptacle, and traction wheels supporting the same, of a rotating beater, a carrier rotating in one direction only and passing below said beater, oppositely-disposed pairs of supporting wheels over which the carrier chains travel, a ratchet wheel fixed to the shaft of one pair of said supporting wheels, ratchet pawls engaging said ratchet wheel, a bell crank lever, connections between the arms of said bell crank lever and the ratchet pawls and through which said pawls are actuated, a crank and pitman connection with the shaft of the rotating beater, an upright lever pivoted at its upper end to said pitman and at its lower end to the manure receptacle, a sleeve on said upright lever, means for shifting said sleeve, a link lever pivoted to the bell crank lever and to said sleeve, the pivot between said link lever and said sleeve being in vertical alinement with the pivot of said upright lever, and whereby the pivotal point between said link lever and said sleeve may be shifted vertically to or from the pivot of the upright lever to impart no driving movement to the ratchet pawl or to impart the required driving movement thereto, and means for actuating the shaft of the rotating beater from the traction wheels, substantially as specified.

In testimony whereof, I sign this specification in the presence of two witnesses.

STEPHEN H. GARST.

Witnesses:
CHARLES T. BURTON,
MAY E. KOTT.